3,652,475
HEAT-CURABLE ELASTOMERIC SILICONE
COMPOSITIONS
Tadashi Wada and Kunio Itoh, Annaka-shi, Japan, assignors to Shinetsu Chemical Company, Tokyo, Japan
No Drawing. Filed Apr. 8, 1970, Ser. No. 26,791
Claims priority, application Japan, Apr. 25, 1969,
44/32,147
Int. Cl. C08g 51/22
U.S. Cl. 260—29.1 B                                    10 Claims

ABSTRACT OF THE DISCLOSURE

A heat curable elastomeric silicone composition consisting of:
(a) 100 parts by weight of polydiorganosiloxane having a degree of polymerization of at least 3,000 and containing at most 0.3 mole percent of vinyl group-containing siloxane units;
(b) From 1 to 10 parts by weight of polydiorganosiloxane having a degree of polymerization of at least 3,000, and containing from 5 to 20 mole percent of vinyl group-containing siloxane units;
(c) From 0.5 to 5 parts by weight of polydiorganosiloxane having a degree of polymerization of from 10 to 1,000 and containing from 5 to 90 mole percent vinyl group-containing siloxane units;
(d) From 20 to 200 parts by weight of a silica filler having a surface area of at least 150 m.$^2$/g; and
(e) A catalytic amount of organic peroxide.

The composition is cured to yield a silicone rubber having a high tear strength, or it is employed as a wire-insulating material, sealing material and packing material, because of its excellent compression set, resiliency, heat-, steam-, and weather-resistances and electrical properties.

SUMMARY OF THE INVENTION

This invention relates to novel elastomeric silicone compositions and more particularly to heat-curable elastomeric silicone compositions which give silicone rubbers possessing greatly improved tear strength.

Prior art silicone rubbers have been prepared by curing with a peroxide such as benzoyl peroxide, ditertiary butyl peroxide, 2,4-dichlorobenzoyl peroxide, dicumyl peroxide, and tertiary butyl perbenzoate, compositions contisting of:
(1) Polydiorganosiloxane gum in which the organic groups are mostly methyl groups with a small number of vinyl groups,
(2) Siloxane ester of low molecular weight or silanol, and
(3) A reinforcing filler.

At these vulcanizates are superior in electrical properties, and heat and weather resistances, they are used in various applications, but they have a big disadvantage in that they have poorer tear strengths than other synthetic rubbers. Various attempts have been made to overcome this disadvantage. In one case, some of the organic groups in the above-mentioned polydiorganosiloxane gum were replaced by phenyl groups, or silphenylene groups were introduced into the main chains, which served to improve the tear strength of the product to some extent, but which caused the elasticity to be reduced, in addition to causing a remarkable degradation of the compression set and the oil resistance thereof. In another case, although the silica filler employed for the purpose of reinforcing has a surface area of at least 300 m.$^2$/g., the tear strength of the product proved to be no more than 20 kg./cm. Thus the problem of how to prepare silicone rubbers having higher tear strength has not before now been solved.

Accordingly, it is an object of this invention to provide heat-curable elastomeric silicone compositions which give silicone rubbers having high tear strengths.

Another object of this invention is to provide heat-curable elastomeric silicone compositions, which, when cured, give silicone rubbers which are superior in compression set, resiliency, heat-, steam- and weather-resistances, and electrical properties in addition to having improved tear strength.

Yet another object of this invention is to provide heat-curable elastomeric silicone compositions, which, when cured, give novel and useful silicone rubbers, possessing excellent low-temperature-deterioration resistance, in addition to the properties already described, and still another object is to provide heat-curable elastomeric silicone compositions which are useful as wire-insulating materials, sealing materials, and packing materials.

Other objects are apparent from the preceding and following disclosure.

The composition of the invention which can attain these purposes comprises:
(a) 100 parts by weight of a polydiorganasiloxane having a degree of polymerization of at least 3,000 and containing no vinyl groups in its molecules, or 100 parts by weight of polydiorganosiloxane having a degree of polymerization of at least 3,000, and containing from 0.02 to 0.3 mole percent of vinyl group-containing silox ane units;
(b) From 1 to 10 parts by weight of a polydiorganosiloxane having a degree of polymerization of at least 3,000, and containing from 5 to 20 mole percent of vinyl group-containing siloxane units;
(c) From 0.5 to 5 parts by weight of a polydiorganopolysiloxane having a degree of polymerization of from 10 to 1,000, and containing from 5 to 90 mole percent of vinyl group-containing siloxane units;
(d) From 20 to 200 parts by weight of a silica filler having a surface area of at least 150 m.$^2$/g; and
(e) A catalytic amount of an organic peroxide.

The present invention has been made through our observations that when polydiorganosiloxane compositions consisting of the above components are heated either under atmospheric pressure or high pressure, silicone rubber vulcanizates with an unexpectedly high tear strength can be prepared.

We noted that a higher tear strength of silicone rubber can be obtained when the cross-linking structure of the cured elastomer is somewhat unevenly distributed rather than when it is uniformly distributed, and after studying it from many angles, we made the following findings which have led to the invention:

(1) When a polydiorganosiloxane gum containing no vinyl groups or only a small number of vinyl groups is mixed with another polydiorganosiloxane gum containing vinyl groups in the range given above, the distribution of the vinyl groups, which, on curing, will cause the cross-linking structure in the product, will become uneven, and (2) In the case of prior-art silicone rubbers prepared of polydiorganosiloxanes containing a large number of vinyl groups, the number of the cross-linkings will be naturally large due to the large number of vinyl groups, which will bring about the degradation of physical properties peculiar to rubber, and disqualify the product for being of practical use. However, when a third component of oily polydiorganosiloxane containing vinyl groups is added to the first two polydiorganosiloxanes, silicone rubbers with an exceedingly high tear strength can be obtained at no sacrifice of properties peculiar to rubber, because the oily siloxane is of low molecular weight.

DETAILED DESCRIPTION

To give a more detailed description of the components employed in practicing the invention, polydiorganosiloxane employed as component (a) consists only of monovalent hydrocarbon groups containing no vinyl groups in their molecules, or of diorganopolysiloxane containing from 0.02 to 0.3 mole percent of vinyl group-containing siloxane units ($CH_2$=CHRSiO) just like the one employed in the production of prior-art silicone rubbers and another diorganopolysiloxane employed as component (b) contains from 5 to 20 mole percent of vinyl group-containing siloxane units. Components (a) and (b) are the principal components of the silicone elastomeric composition of the invention, so that they must have a degree of polymerization of at least 3,000 so as to be successfully processed into a rubber product. From the reasons given above, an oily polysiloxane employed as component (c) is required to have a low degree of polymerization of from 10 to 1,000, and contain from 5 to 90 mole percent of vinyl group-containing siloxane units.

In order to attain the objects of the invention, the ratio of component (a) to components (b) and (c) has to be 100 parts by weight of component (a) to from 1 to 10 parts by weight of component (b) and from 0.5 to 5 parts by weight of component (c).

The polydiorganosiloxane containing no vinyl groups at all and employed as component (a) has a polysiloxane skeleton structure represented by:

$$(R_2SiO)_n$$

where R is a saturated monovalent hydrocarbon group such as methyl or phenyl group, and the terminal group of the molecular chain consists either of a hydroxyl group or of a saturated monovalent hydrocarbon group like the one described above and $n$ is a positive integer. On the other hand, all the polydiorganosiloxanes employed as vinyl group-containing components (a), (b), and (c) have a polysiloxane skeleton structure consisting of the above-mentioned $(R_2SiO)_n$ units and 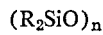 units, with their molecular chains terminated by monovalent organic groups such as hydroxyl groups, methyl groups, phenyl groups, and vinyl groups, where $m$ is a positive integer. These may be prepared by polymerizing to the desired degree, in the presence of an alkali or acid catalyst, one or their mixtures of cyclosiloxanes such as octamethyl tetracyclosiloxane, hexamethyl tricyclosiloxane, tetraalkyl tetravinyl cyclosiloxane, octaphenyl tetracyclosiloxane, hexaphenyl tricyclosiloxane, tetramethyl tetraphenyl cyclosiloxane, and the like.

As in the case of prior-art elastomeric silicone compositions, in order to reduce the brittle point at low temperatures of the silicone rubbers prepared by the method of the invention, phenyl groups may be introduced into each of the molecules of the three kinds of polyorganosiloxanes employed in their production. But if excessive phenyl groups are present in them, the elasticity and oil-resistance of the silicone rubbers prepared of them will be degraded, so that it is preferable that not more than 5 mole percent of phenyl-group containing siloxane units ($C_6H_5RSiO$) should be contained in the silicones in components (a) and (b), and not more than 20 mole percent of them should be present in component (c).

Ordinary silica fillers used for prior art silicone rubbers can be employed as component (d), and can be exemplified by finely divided powders of silica such as fumed silica and silica aerogel. If the particle size of the silica is large, the mechanical strength of the silicone rubber obtained will be reduced, so that the particle size of the silica must be fine enough to have a surface area of at least 150 m.$^2$/g. as measured by the nitrogen absorption method. The quantity of such silica to be incorporated in the composition is from 20 to 200 parts by weight to the above quantities of components (a), (b) and (c).

The organic peroxide which is employed as component (e) is required for curing the above-mentioned polydiorganosiloxanes, and is exemplified by the well-known benzoyl peroxide, ditertiary butyl peroxide, 2,4-dichlorobenzoyl peroxide, dicumyl peroxide and tertiary butyl perbenzoate. The quantity of the organic peroxide to be employed is from 0.1 to 5% by weight to the total quantities of components (a), (b), and (c). It may be dispersed in ordinary silicone oil to give a pasty substance before being incorporated in the composition.

The heat-curable elastomeric silicone compositions of this invention are prepared by kneading the mixtures of the above components (a), (b), (c), (d), and (e) by means of a two-roll rubber mill or a Banbury mixer, together with, if necessary, a dispersing agent such as siloxane ester of low molecular weight or silanol, e.g., diphenylsilanediol or diphenyl methyl silanol, a heat-resistance improving agent such as ferrous oxide, cerium oxide, or ferrous octoate, and pigments.

There is not particular order in which the above components need to be mixed, but usually components (a), (b), (c), and (d) are homogeneously mixed first, and then to this mixture is added component (e) as a catalyst.

The compositions of the present invention are heated at a temperature between 80° and 200° C. either under atmospheric pressure or high pressure, for a period of from about 30 seconds to about 1 hour, and then, if desired, at a temperature between 150° C. and 250° C. for a period of from 2 to 10 hours to accomplish post-curing, thereby obtaining silicone rubbers possessing high tear strength, as well as superior compression set, resiliency, heat-, weather- and steam-resistances, and electrical properties. Consequently, the compositions of the invention are very useful as wire-insulating materials, sealing materials, and packing materials, especially in such places where high tear strengths are required.

The details of the invention will be further described in the following examples in which all parts and percents are parts and percents by weight.

Example 1

100 parts of polydimethylsiloxane gum having a degree of polymerization of about 10,000; 7 parts of polymethylvinylsiloxane gum having a degree of polymerization of about 10,000 and consisting of 90 mole percent of dimethylsiloxy units and 10 mole percent of methyl vinyl siloxy units; 2 parts of polymethylvinylsiloxane oil having a degree of polymerization of about 100 and consisting of 95 mole percent of dimethyl siloxy units and 5 mole percent of methyl vinyl siloxy units: 40 parts of silica aerogel having a surface area of 300 m.$^2$/g.; and 4 parts of diphenylsilanediol were kneaded on a two-roll rubber mill and then heated at 150° C. for one hour in order to remove volatile siloxane component and water.

Subsequently to the kneaded mixture was homogeneously added 0.5% of benzoyl peroxide as a curing catalyst, and pressed at 120° C. under a pressure of 30 kg./cm.$^2$ for 10 minutes into a 2 mm. thick sheet. The elastomeric properties of the samples thus prepared and of those subjected to post-cure heating at 200° C. for 4 hours were as shown below.

| | After being pressed | After being further subjected to post-cure heating |
|---|---|---|
| Hardness (ASTM-D-676) | 42 | 50 |
| Elongation (percent) (ASTM-D-412) | 750 | 700 |
| Tensile strength (kg./cm.$^2$) | 80 | 82 |
| Tear strength (kg./cm.) (ASTM-D-624) | 40 | 35 |
| Resiliency (percent) (Bashore) | 40 | 41 |
| Brittle point, ° C | −65 | |

Example 2

100 parts of polydiorganosiloxane gum having a degree of polymerization of about 8,000 and consisting of 99.9 mole percent of dimethyl siloxy units and 0.1 mole percent of methyl vinyl siloxy units; 3 parts of polydiorganosiloxane gum having a degree of polymerization of about 6,000 and consisting of 90 mole percent of dimethyl siloxy units and 10 mole percent of methyl vinyl siloxy units; 2 parts of polymethylvinylsiloxane oil having a degree of polymerization of about 200 and consisting of 90 mole percent of dimethyl siloxy units and 10 mole percent of methyl vinyl siloxy units; 40 parts of fumed silica having a surface area of 300 $m^2/g.$; and 5 parts of diphenyl methyl silanol were kneaded on a two-roll rubber mill and then heated at 150° C. for 1 hour.

Subsequently to the kneaded mixture were homogeneously added 1.5% by weight of silicon oil paste containing 50% by weight of 2,4-dichlorobenzoyl peroxide, and pressed at 120° C. under a pressure of 30 kg./cm.$^2$ for 10 minutes into a 2 mm. thick sheet. The elastomeric properties of the samples thus prepared and of those further subjected to post-cure heating at 250° C. for 24 hours were as shown below.

|  | After being pressed | After being further subjected to post-cure heating |
|---|---|---|
| Hardness | 43 | 50 |
| Elongation (percent) | 700 | 580 |
| Tensile strength (kg./cm.$^2$) | 100 | 80 |
| Tear strength (kg./cm.) | 40 | 30 |
| Resiliency (percent) (Bashore) | 40 |  |

Example 3

To the kneaded mixture prepared in Example 2 was homogeneously added 0.5% of ditertiary butyl peroxide as a catalyst, and pressed at 170° C. under a pressure of 30 kg./cm.$^2$ for 10 minutes into a 2 mm. thick sheet. The elastomeric properties of the samples thus prepared and of those subjected to post-cure heating at 200° C. for 4 hours were as shown below.

|  | After being pressed | After being further subjected to post-cure heating |
|---|---|---|
| Hardness | 48 | 52 |
| Elongation (percent) | 670 | 620 |
| Tensile strength (kg./cm.$^2$) | 103 | 100 |
| Tear strength (kg./cm.) | 38 | 37 |
| Resiliency (percent) (Bashore) | 53 | 52 |

Example 4

100 parts of polydiorganosiloxane gum having a degree of polymerization of 12,000 and consisting of 96.9% of dimethylsiloxy units, 3 mole percent of diphenylsiloxy units, and 0.1 mole percent of methyl vinyl siloxy units; 4 parts of polydiorganosiloxane gum having a degree of polymerization of about 10,000 and consisting of 92 mole percent of dimethyl siloxy units, 5 mole percent of methyl vinyl siloxy units, and 3 mole percent of diphenyl siloxy units; 0.8 part of polymethyl vinyl siloxane oil having a degree of polymerization of about 400, and consisting of 80 mole percent of dimethyl siloxy units, 20 mole percent of methyl vinyl siloxy units; 45 parts of fumed silica having a surface area of 380 m.$^2$/g.; 3 parts of diphenylmethylsilananol; and 3 parts of diphenylsilanediol were compounded on a Banbury mixer to obtain a homogeneous mixture, which was heated at 150° C. for 2 hours.

To the mixture thus obtained were added 1.2% of silicone oil paste containing 50% by weight of benzoyl peroxide, and pressed at 120° C. under a pressure of 30 kg./cm.$^2$ for 10 minutes into a 2 mm. thick sheet. The elastomeric properties of the samples thus prepared and of those further subjected to post-cure heating either at 200° C. for 72 hours or at 250° C. for 24 hours proved to be as given below.

|  | After being pressed | After being further subjected to post-cure heating 200° C. × 72 hr. | 250° C. × 24 hr. |
|---|---|---|---|
| Hardness | 50 | 56 | 55 |
| Elongation percent | 700 | 603 | 530 |
| Tensile strength (kg./cm.$^2$) | 112 | 110 | 90 |
| Tear strength (kg./cm.) | 45 | 38 | 34 |
| Resiliency percent (Bashore) | 40 |  |  |
| Brittle point (° C.) | −90 |  |  |

Example 5 and controls

To the siloxane composition consisting of hydroxydimethyl end-blocked siloxane gums (components (a) and (b)) and trimethylsilyl end-blocked dimethyl siloxane oil (component (c)) were added 5 parts of diphenylsilanediol and 40 parts of fumed silica having a surface area of 380 m.$^2$/g., and compounded on a two-roll rubber mill, and to the kneaded mixture was homogeneously added as a curing agent 0.5% of dicumyl peroxide relative to the total mixture, and pressure at 160° C. under a pressure of 30 kg./cm.$^2$ for 10 minutes into a 2 mm. thick sheet, which was further subjected to heating at 200° C. for 4 hours. The samples thus prepared proved to have the elastomeric properties as given in Table 2.

TABLE 1

| No. | Component (a) | | | Component (b) | | | Component (c) | | |
|---|---|---|---|---|---|---|---|---|---|
|  | Mole percent of methylvinyl siloxy units [1] | Degree of polymerization | Parts | Mole percent of methylvinyl siloxy units [1] | Degree of polymerization | Parts | Mole percent of methylvinyl siloxy units [1] | Degree of polymerization | Parts |
| Control: |  |  |  |  |  |  |  |  |  |
| 1 | 0 | 10,000 | 100 | 10 | 10,000 | 0.7 | 5 | 100 | 2 |
| 2 | 0 | 10,000 | 100 | 10 | 10,000 | 15 | 5 | 100 | 2 |
| 3 | 0 | 10,000 | 100 | 3 | 10,000 | 10 | 5 | 100 | 2 |
| 4 | 0.3 | 8,000 | 100 | 30 | 10,000 | 1.5 | 5 | 100 | 1 |
| 5 | 0.045 | 8,000 | 100 | 10 | 10,000 | 3 |  |  | 0 |
| 6 | 0.045 | 8,000 | 100 | 10 | 10,000 | 3 | 10 | 200 | 7 |
| 7 | 0.045 | 8,000 | 100 | 10 | 10,000 | 3 | 2 | 200 | 3 |
| 8 | 0.045 | 8,000 | 100 | 10 | 10,000 | 2 | 100 | 200 | 0.7 |
| Example 5 | 0.045 | 8,000 | 100 | 10 | 10,000 | 2 | 10 | 200 | 1.5 |

[1] Contained in the component.

TABLE 2

| No. | Hardness | Elongation percent | Tensile strength (kg./cm.²) | Tear strength (kg./cm.) | Remarks |
|---|---|---|---|---|---|
| Control: | | | | | |
| 1 | 35 | 700 | 50 | 27 | Resiliency: 30% semi-cured rubber. |
| 2 | 62 | 270 | 60 | 20 | Low elongation, brittle. |
| 3 | 59 | 360 | 72 | 22 | |
| 4 | 65 | 320 | 85 | 18 | Exceedingly low heat resistance. |
| 5 | 50 | 660 | 82 | 27 | |
| 6 | 53 | 700 | 63 | 28 | |
| 7 | 51 | 580 | 95 | 26 | |
| 8 | 48 | 700 | 80 | 33 | Tear strength (after the sample as heated at 250° C. for 20 hrs.): >20, pin holes were liable to appear all over the sheet. |
| Example 5 | 50 | 600 | 98 | 39 | |

What is claimed is:

1. A heat-curable elastomeric silicone composition consisting essentially of:
   (a) 100 parts by weight of a first polydiorganosiloxane having a polysiloxane skeleton structure represented by $(R_2SiO)_n$ wherein R is a saturated monovalent hydrocarbon group selected from the group consisting of methyl and phenyl radicals, and $n$ is a positive integer of at least 3,000, and having a molecular chain terminated by a monovalent radical selected from the group consisting of hydroxyl group and said monovalent hydrocarbon group;
   (b) from 1 to 10 parts by weight of a second polydiorganosiloxane having a polysiloxane skeleton structure represented by $(R_2SiO)_n(CH_2=CHRSiO)_m$ wherein R is a saturated monovalent hydrocarbon group selected from the group consisting of methyl and phenyl radicals, $n$ and $m$ are positive integers, and $n+m$ is at least 3,000, having a molecular chain terminated by a monovalent radical selected from the group consisting of hydroxyl group, said monovalent hydrocarbon group and vinyl radical, and containing from 5 to 20 mole percent of the vinyl radical containing siloxane units;
   (c) from 0.5 to 5 parts by weight of a third polydiorganosiloxane having a polysiloxane skeleton structure represented by $(R_2SiO)_n(CH_2=CHRSiO)_m$ wherein R is a saturated monovalent hydrocarbon group selected from the group consisting of methyl and phenyl radicals, $n$ and $m$ are positive integers, and $n+m$ is from 10 to 1,000, having a molecular chain terminated by a monovalent radical selected from the group consisting of hydroxyl group, said monovalent hydrocarbon group and vinyl radical and containing from 5 to 90 mole percent of the vinyl radical containing siloxane units;
   (d) from 20 to 200 parts by weight of a silica filler having a surface area of at least 150 m.²/g.; and
   (e) a catalytic amount of an organic peroxide.

2. The heat-curable elastomeric silicone composition of claim 1 in which the organic peroxide is present in an amount of from 0.1 to 5% by weight relative to the total polysiloxane components.

3. The heat-curable elastomeric silicon composition of claim 1 in which the organic peroxide is selected from the group consisting of benzoyl peroxide, ditertiary butyl peroxide, 2,4-dichlorobenzoyl peroxide, dicumyl peroxide, and tertiary butyl perbenzoate.

4. The heat-curable elastomeric silicone composition of claim 1 containing, in addition, a dispersing agent selected from the group consisting of low-molecular weight siloxane esters and silanols.

5. The heat-curable elastomeric silicone composition of claim 1, in which said first polydiorganosiloxane contains up to about 5 mole percent of phenyl group-containing siloxane units, in which said second polydiorganosiloxane contains up to about 5 mole percent of phenyl group-containing siloxane units, and in which said third polydiorganosiloxane contains up to about 20 mole percent of phenyl group-containing siloxane units.

6. A heat-curable elastomeric silicone composition consisting essentially of:
   (a) 100 parts by weight of a first polydiorganosiloxane having a polysiloxane skeleton structure represented by $(R_2SiO)_n(CH_2=CHRSiO)_m$ wherein R is a saturated monovalent hydrocarbon group selected from the group consisting of methyl and phenyl radicals, $n$ and $m$ are positive integers, and $n+m$ is at least 3,000, having a molecular chain terminated by a monovalent radical selected from the group consisting of hydroxyl group, said monovalent hydrocarbon group and vinyl radical, and containing from 0.02 to 0.3 mole perecent of the vinyl radical containing siloxane units;
   (b) from 1 to 10 parts by weight of a second polydiorganosiloxane having a polysiloxane skeleton structure represented by $(R_2SiO)_n(CH_2=CHRSiO)_m$ wherein R is a saturated monovalent hydrocarbon group selected from the group consisting of methyl and phenyl radicals, $n$ and $m$ are positive integers, and $n+m$ is at least 3,000, having a molecular chain terminated by a monovalent radical selected from the group consisting of hydroxyl group, said monovalent hydrocarbon group and vinyl radical, and containing from 5 to 20 mole percent of the vinyl radical containing siloxane units;
   (c) from 0.5 to 5 parts by weight of a third polydiorganosiloxane having a polysiloxane skeleton structure represented by $(R_2SiO)_n(CH_2=CHRSiO)_m$ wherein R is a saturated monovalent hydrocarbon group selected from the group consisting of methyl and phenyl radicals, $n$ and $m$ are positive integers, and $n+m$ is from 10 to 1,000, having a molecular chain terminated by a monovalent radical selected from the group consisting of hydroxyl group, said monovalent hydrocarbon group and vinyl radical, and containing from 5 to 90 mole percent of the vinyl radical containing siloxane units;
   (d) from 20 to 200 parts by weight of silica filler having a surface area of at least 150 m.²g.; and
   (e) a catalytic amount of an organic peroxide.

7. The heat-curable elastomeric silicone composition of claim 6 in which the organic peroxide is present in an amount of from about 0.1 to about 5% by weight relative to the total polysiloxane components.

8. The heat-curable elastomeric silicon composition of claim 6 in which the organic peroxide is selected from the group consisting of benzoyl peroxide, ditertiary butyl peroxide, 2,4-dichlorobenzoyl peroxide, dicumyl peroxide, and tertiary butyl perbenzoate.

9. The heat-curable elastomeric silicone composition of claim 6 consisting, in addition, of a dispersing agent selected from the group consisting of low-molecular weight siloxane esters and silanols.

10. The heat-curable elastomeric silicon composition of claim 6, in which said first polydiorganosiloxane contains up to about 5 mole percent of phenyl group-containing siloxane units, in which said second polydiorganosiloxane contains up to about 5 mole percent of phenyl group-containing siloxane units, and in which said third polydiorganosiloxane contains up to about 20 mole percent of phenyl group-containing siloxane units.

References Cited
UNITED STATES PATENTS

| | | | |
|---|---|---|---|
| 3,006,878 | 10/1961 | Talcott | 260—825 X |
| 3,341,490 | 9/1967 | Burdick et al. | 260—825 X |
| 3,518,324 | 6/1970 | Polmanteer | 260—825 |

LEWIS T. JACOBS, Primary Examiner

U.S. Cl. X.R.

260—37 SB, 825